(12) United States Patent
Levy et al.

(10) Patent No.: US 9,077,558 B2
(45) Date of Patent: Jul. 7, 2015

(54) CLIENT/BRIDGE FAILURE RECOVERY METHOD AND SYSTEM

(75) Inventors: Phil Levy, Brampton (CA); Amin Abdul, Thornhill (CA)

(73) Assignee: SIEMENS CANADA LIMITED, Oakville, Ontario (CA)

( * ) Notice: Subject to any disclaimer, the term of this patent is extended or adjusted under 35 U.S.C. 154(b) by 1094 days.

(21) Appl. No.: 12/398,793

(22) Filed: Mar. 5, 2009

(65) Prior Publication Data

US 2010/0220701 A1 Sep. 2, 2010

(30) Foreign Application Priority Data

Feb. 27, 2009 (CA) ...................................... 2656660

(51) Int. Cl.
*H04L 12/46* (2006.01)
*H04L 29/12* (2006.01)
*H04W 8/26* (2009.01)
*H04W 84/22* (2009.01)

(52) U.S. Cl.
CPC ....... *H04L 12/4625* (2013.01); *H04L 29/12839* (2013.01); *H04L 61/6022* (2013.01); *H04W 8/26* (2013.01); *H04W 84/22* (2013.01)

(58) Field of Classification Search
CPC .............. H04L 12/462; H04L 12/4625; H04L 61/6022; H04W 8/26; H04W 84/22
USPC ........................................................ 370/338
See application file for complete search history.

(56) References Cited

U.S. PATENT DOCUMENTS

| | | | |
|---|---|---|---|
| 2002/0085719 A1* | 7/2002 | Crosbie ......................... | 380/248 |
| 2003/0063593 A1* | 4/2003 | Koyanagi et al. ............. | 370/338 |
| 2003/0064752 A1* | 4/2003 | Adachi et al. ................. | 455/560 |
| 2003/0123463 A1* | 7/2003 | Yoshida et al. ............... | 370/401 |
| 2005/0078624 A1* | 4/2005 | Shu et al. ...................... | 370/328 |
| 2005/0198331 A1* | 9/2005 | Okajima et al. .............. | 709/229 |
| 2005/0207414 A1* | 9/2005 | Duvvury ....................... | 370/389 |
| 2007/0165629 A1* | 7/2007 | Chaturvedi et al. ........... | 370/389 |

* cited by examiner

*Primary Examiner* — Huy D Vu
*Assistant Examiner* — Stephen J Clawson (57) ABSTRACT

The transmission of data is accomplished across a network having wireless and wired interfaces. Data is transferred through a wireless interface from an Access Point to a Client/Bridge and then to one of a Intelligent Electrical Device (IED) connected to the Client/Bridge through a wired connection. Data is transferred from the Access Point to the Client/Bridge through a 4 address mode wireless interface having originator, transmitter, receiver and destination address fields. The Client/Bridge determines context cache information representing the media access control numbers of each of the IEDs connected to the Client/Bridge through the wired interface and transfers this context cache information to the AP. In the event of a failure of the Client/Bridge, the context cache information stored at the AP can be transferred to the Client/Bridge using the wireless interface to facilitate recovery of the Client/Bridge.

14 Claims, 10 Drawing Sheets

CLIENT/BRIDGE FAILURE RECOVERY METHOD AND SYSTEM

FIELD OF THE INVENTION

This invention relates to a Client/Bridge, and method and system for using a Client/Bridge to provide Layer 2 bridging to transfer data in a mixed wired and wireless network. More specifically, the present invention relates to a method to provide Layer 2 bridging between an IEEE 802.11 compatible infrastructure and a wired infrastructure for point to point (P2P) and point to multipoint (P2MP) network topologies.

BACKGROUND OF THE INVENTION

In the past, mixed wireless and wired networks have been used to transfer data. One common standard for a wireless network is the standard IEEE 802.11 infrastructure network. In standard use, the IEEE 802.11 infrastructure network provides for a single hop transmission between an Access Point (AP) and a Client through a wireless medium, using a '3 address field' format called the 3A mode frame.

The IEEE 802.11 network will transfer data nominally using a 3A mode frame format which defines 3 address fields for standard usage. These 3 address fields given in the 3-A mode frame represent the Layer 2 Media Access Control (MAC) addresses uniquely identifying the 'transmitter', 'receiver' and a 'device' interfaces respectively. These MAC numbers are unique hardware numbers for each Intelligent Electrical Device connected to a network. The MAC numbers uniquely identify each IED in the network. In an Ethernet Local Area Network, the MAC numbers are the same as the Ethernet address.

The IEEE 802.11 Access Point (AP) when transferring data towards a Client (termination point) will nominally use the 3A mode frame format which defines 3 address fields for standard usage. In this communication direction, the IEEE 802.11 3-A mode frame format stipulates that the 'transmitter' field will be the AP address, the 'receiver' field will be the Client address and the 'device' field will be the address of the original data-producing device on the LAN. The IEEE 802.11 Client when transferring data towards an Access Point will also nominally use the 3A mode frame format which defines 3 address fields for standard usage. In this communication direction, the IEEE 802.11 3-A mode frame format stipulates that the 'transmitter' field will be the Client address, the 'receiver' field will be the AP address and the 'device' field will be the address of the final data-consuming device on the LAN. Although the IEEE 802.11 interface does support a mode allowing 4 possible address values to be used, in both communicating directions only 3 address values are actually transferred between the Access Point (AP) and the Client side when using the standard 3A mode frame. The interpretation of the 3 address fields within the IEEE 802.11 messaging changes depending on which side (AP or Client side) has initiated the communication.

While useful the standard IEEE 802.11 infrastructure (which relies entirely on 3A mode frame transactions) suffers from the disadvantage that each wireless Client can only represent a single IED, such that a number of separate clients all with wireless capabilities, are required in order to communicate with the Access Point (AP) and therefore the other IEDs in the network. This can increase the cost of the overall network by requiring a large number of wireless clients. Furthermore, a large number of wireless clients communicating with a single Access Point (AP) can also decrease the efficiency of the system because wireless transmission across the IEEE 802.11 infrastructure may be slowed down if there is a number of clients all communicating with the same Access Point.

Therefore, the standard or prior art IEEE 802.11 standard infrastructure forms a wireless single hub network where all participating stations will both send and receive frames via the associated Access Point (AP) device. In this manner, the prior art AP operates as a "relay agent" between all participating stations and the stations individually serve as Layer 2 terminations or end point device. In the standard IEEE 802.11 standard, it is not possible to transfer data to and from devices located behind the client in a standard IEE 802.11 network, since the client is normally considered as the termination point in a standard IEEE 802.11 network.

Therefore, there is a need in the art for a more efficient system to provide Layer 2 bridging within an IEEE 802.11 infrastructure Point-to-Point (P2P) and Point-to-Multipoint (P2MP) network typologies while at the same time keeping the Layer 2 information synchronized to have coherency of all MAC addresses across all of the network and all of the bridges within the overall network typology.

SUMMARY OF THE INVENTION

Accordingly, it is an object of this invention to at least partially overcome some of the disadvantages of the prior art. Also, it is an object of this invention to provide an improved hybrid client, preferably compatible with the IEEE 802.11 interface but also providing bridging functionality to wired components located behind the Client/Bridge facilitating Layer 2 connectivity to wired devices connected to the client/bridge.

Accordingly, in one of its aspects, this invention resides in a network having a plurality of Intelligent Electrical Devices (IEDs), a method of transferring data from an Access Point (AP) through a first 4Address (4A) mode wireless interface having originator, transmitter, receiver and destination address fields, to at least one of a plurality of Intelligent Electrical Devices (IEDs) connected to a Client/Bridge through a second wired interface, said method comprising: determining a unique Media Access Control (MAC) number for each of the AP and the Client/Bridge; determining, by the Client/Bridge, the device MAC numbers for each of the plurality of IEDs connected to the Client/Bridge through the second wired interface and storing, at the Client/Bridge, context cache information representing the device MAC numbers of each IED connected to the Client/Bridge; transferring from the Client/Bridge to the AP the context cache information using the first wireless interface; storing a copy of the context cache information at the AP; populating the originator, transmitter, receiver and destination address fields of the 4A mode wireless interface with a sender IED MAC identifying a sender IED in the network, the AP MAC, the Client/Bridge MAC and the device MAC uniquely identifying the at least one of the plurality of IEDs connected to the Client/Bridge through the second wired interface, respectively; and sending the data from the AP to the Client/Bridge; converting, at the Client/Bridge, the data from the first wireless interface to the second wired interface; and sending the data from the Client/Bridge to the the at least one of the plurality of IEDs connected to the Client/Bridge identified by the device MAC in the destination address field.

In a further aspect, the present invention resides in a Client/Bridge to transfer data between a wireless access point (AP) utilizing a first 4 Address (4A) mode wireless interface having originator, transmitter, receiver and destination address fields, and, two or more Intelligent Electrical Devices (IEDs)

connected to the Client/Bridge and utilizing a second wired interface, said Client/Bridge comprising: a wireless connection to communicate with the AP through the first 4A wireless interface; a wired connection to communicate with the two or more IEDs connected to the Client/Bridge through the second wired interface; discovery logic for determining unique device Media Access Control (MAC) numbers of each IED connected to the second wired connection; memory for storing context cache information representing the device MAC numbers of each IED connected to the wired connection; a Layer 2 bridge coupled to the wireless connection and the wired connection, said Layer 2 bridge containing transferring data between the wireless connection in the first wireless interface and the wired connection in the second wired interface; wherein data is received by the wireless connection if the receiver address field of the 4A wireless interface uniquely identifies a MAC of the Client/Bridge; and wherein the data is converted by the layer 2 bridge to the second wired interface and sent to the IED connected to the wired connection having a device MAC identified in the context cache stored in memory that corresponds to the device MAC number in the destination address field of the 4A wireless interface associated with the data.

In a still further aspect, the present invention resides in a network for transferring data, said network comprising: a first Access Point (AP) for transferring data through a first 4Address (4A) mode wireless interface having originator, transmitter, receiver and destination address fields; a first Client/Bridge for transferring data from the Access Point through the first 4Address (4A) mode wireless interface to two or more Intelligent Electrical Devices (IEDs) connected to the first Client/Bridge through a second wired interface; wherein each of said first AP, said first Client/Bridge and said two or more IEDs have a unique Media Access Control (MAC) number to uniquely identify them in the network, and, said Client/Bridge determine the MACs of said two or more IEDs connected thereto through the second wired interface and stores context cache information representing the device MAC numbers of each IED connected to the Client/Bridge through the second wired interface locally in Client/Bridge memory; wherein the Client/Bridge periodically transfers the content cache information to the first AP for storage locally in said first AP memory; wherein data transferred from the first AP to the first Client/Bridge contains the first AP MAC in the transmitter field, the first client/Bridge MAC in the receiver field and the MAC of the IED to which the data is destined in the destination field; and wherein the Client/Bridge converts the received data through the first interface to the second interface and sends the data to the IED having the MAC contained in the destination field through the second wired interface.

One advantage of the present invention is to facilitate Layer 2 bridging within a mixed wired and wireless network, and in a preferred embodiment a wireless network based on the IEEE 802.11 infrastructure where there are IEDs connected to a Client/Bridge through a wired interface. In one aspect, the present invention facilitates synchronization and maintenance of Layer 2 forwarding fabric consistency within the overall network topology across both wired and wireless boundaries.

In another aspect, an advantage of the present invention relates to acquiring information regarding wired devices located behind the Client/Bridge in a seamless manner. In one preferred embodiment this is accomplished by the Client/Bridge monitoring communication between the wired devices behind the Client/Bridge and the Access Point. This information obtained by the Client/Bridge, which may be referred to as context cache information, is then mirrored in the associated AP communicating with the Client/Bridge to facilitate communication between other devices in the network and the wired devices, which could be any Intelligent Electrical Device (IED), connected behind the Client/Bridge. This also facilitates recovery of the Client/Bridge in the case of temporary failure, such as loss of power, by permitting this information regarding the IEDs connected to the Client/Bridge to be resent to the Client/Bridge from the AP at resumption of operation of the Client/Bridge. In this way, the AP acts as a remote backup for this information, improving recovery of the network in the event of a temporary loss of a Client/Bridge.

In this embodiment, the Access Point also allows for the use of an alternate 4A mode frame format (not in standard usage) which defines 4 address fields and is supported by the IEEE 802.11 infrastructure. These 4 fields represent the Layer 2 Media Access Control (MAC) addresses which uniquely identifies the 'originator', 'transmitter', 'receiver' and 'destination' interface addresses therefore resolving any ambiguity in pinpointing both the origin and final destination of all addressed frames. As an example of the 4A frame usage when transferring data being generated by an Intelligent Electrical Device (IED) connected to one of the wired ports of (i.e. located behind) an 802.11 Client/Bridge through the wired connection, being sent towards a PC located on a network which is being serviced (i.e. located behind) an Access Point (AP), the 'originator' address identifies the Intelligent Electrical Device (IED) which is connected to a Client/Bridge by a wired connection sending the data; the 'transmitter' address identifies the 802.11 Client transmitting the data through the wireless medium; the 'receiver' address identifies the Access Point (AP) receiving the data while the 'destination' interface refers to the IED in overall network expecting to receive the IED data.

In a further aspect, an advantage of the present invention relates to maintaining Layer 2 forwarding fabric consistency during wireless topology changes, such as network roaming of individual Client/Bridges between two or more Access Points. In this aspect, since the Client/Bridge hybrid maintains the latest cache context it is able to actively participate in reconstructing of context cache information at the new AP, advising the new AP of the old AP, and updating the layer 2 forward fabric of the network to reflect this change in the network Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

The present invention enables the implementation of Layer 2 bridging within IEEE 802.11 infrastructure Point-to-Point (P2P) and Point-to-Multipoint (P2MP) network topologies by utilizing the 4 address modes of a wireless interface, such as the IEEE 802.11 infrastructure, while keeping the Layer 2 information synchronized and simultaneously maintaining the Layer 2 forwarding fabric consistency within the overall network topology including wired and wireless components of the network. As a result, the IEEE 802.11 infrastructure mode forms a 2-hop instead of a single-hop Layer 2 wireless carrier network permitting Intelligent Electronic Devices (IEDs) in the network to address two or more IEDs connected behind a Client/Bridge device through a wired connection. Wired End-Point (terminal) devices, such as IEDs including Remote Terminal Units (RTUs) or Personal Computers (PCs) which are directly or indirectly connected to either the Client/Bridge or the AP side of this IEEE 802.11 wireless network, treat this infrastructure as a Two-hop Layer 2 Bridge network.

Preferred embodiments of the invention and its advantages can be understood by referring to the present drawings. In the present drawings, like numerals are used for like and corresponding parts of the accompanying drawings.

Figure 1:
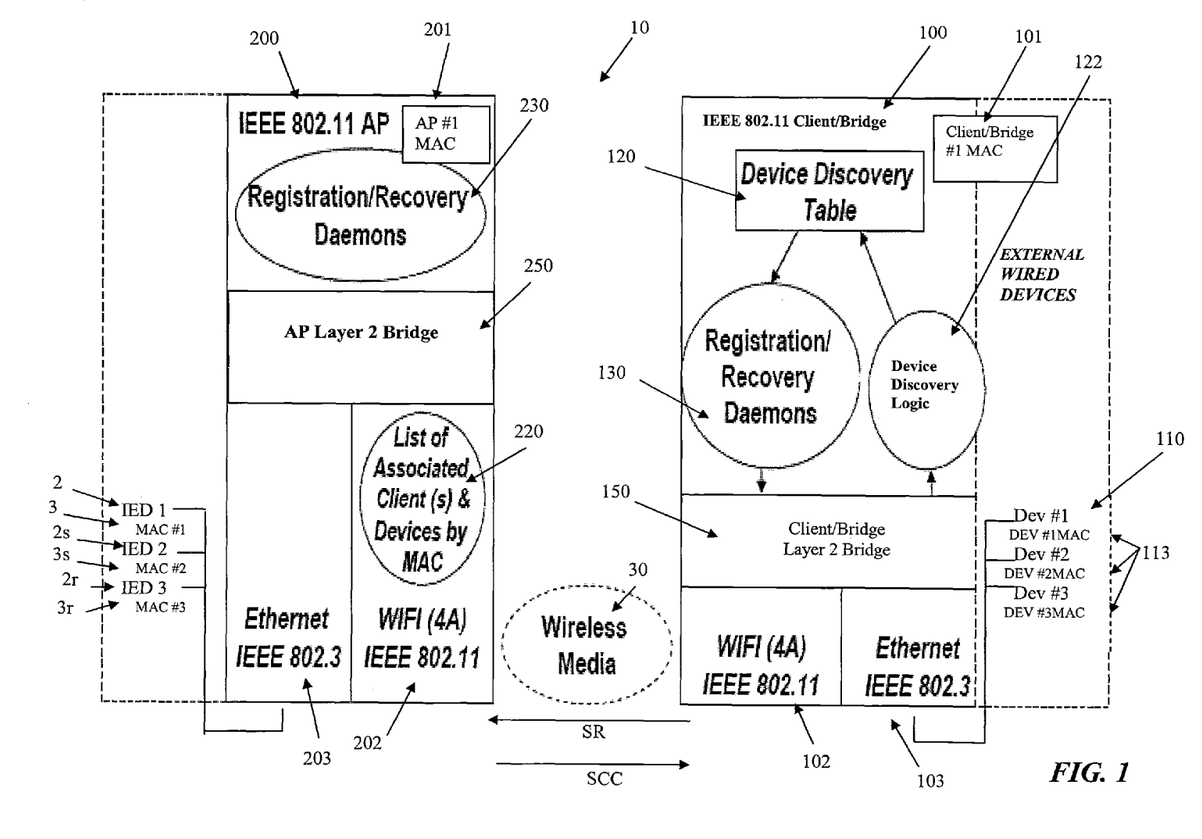
FIG. 1 is a schematic diagram showing the infrastructure of an IEEE 802.11 Access Point and IEEE 802.11 Client/Bridge having wired Ethernet connections and a Layer 2 bridge thereto according to one aspect of the present invention.

As shown in FIG. 1, one network utilizing the present invention, shown generally by reference numeral 10, comprises an Access Point (AP), shown generally by reference numeral 200, wirelessly communicating with an Client/Bridge shown generally by reference numeral 100, according to one embodiment of the present invention. As illustrated in FIG. 1, the Access Point (AP) has a wired connection 203, which in a preferred embodiment utilizes the Ethernet IEEE 802.3 infrastructure to communicate with a plurality of Intelligent Electrical Devices (IEDs) shown generally by reference numeral 2. Each IED will also have an associated Media Access Control (MAC) number, show generally by reference numeral 3.

The IEDs may be any type of Intelligent Electronic Device such as a PC, RTU or other device. The IEDs are also identified by reference numerals 2s and 3s identifying the Sender IED 2s and the MAC 3s of the sender IED 2s. Similarly, reference numerals 2r and 3r are used to identify the Receiver IED 2r and the MAC 3r of the receiver IED, depending on whether the IED 2 is sending or receiving data. It is understood however that each IED 2 may also be used to send or receive data, and, identification of a specific IED 2 as a Sender IED 2s or a Receiver IED 2r is done merely for ease of reference.

The Access Point (AP) 200 will also have a Media Access Control number (MAC), identified generally by reference numeral 201 and by the number AP #1 MAC in this example for ease of reference. Similarly, the Client/Bridge 100 will have a Client/Bridge MAC, shown generally by reference numeral 101 and in this example shown generally by Client/Bridge #1 MAC. It is understood that the MAC numbers are not dynamically allocated, but rather are the MAC numbers used to identify where to direct data in a network. This is to be contrasted, for example, with the Internet Protocol (IP) number which can be dynamically allocated.

The Access Point (AP) 200 comprises a wired connection shown generally by reference numeral 203 which may be used to communicate to the IED 2 connected to the network 2. The AP 200 also comprises a wireless connection 202, which is preferable IEEE 802.11 compatible to communicate through the wireless media 30 to the wireless devices, including the Client/Bridge.

The Client/Bridge 100 has a corresponding wireless connection, shown generally by reference numeral 102, uses a 4 Address (4A) mode wireless interface and in a preferred embodiment is compatible to the IEEE 802.11 infrastructure. In this preferred embodiment, the Client/Bridge 100 also has two or more Intelligent Electrical Devices (IEDs), identified generally by reference numeral 110 connected to the Client/Bridge 100 through the wired connection 103. In a preferred embodiment the wired connection 103 is Ethernet IEEE 802.3 infrastructure compatible. The IEDs 110 will also have MAC numbers. Dev #1 MAC, Dev #2 MAC and Dev #3 MAC uniquely identifying them and identified generally by reference numeral 113.

To facilitate transferring of data between the wireless connection 102 and the wired connection 103, the Client/Bridge preferably comprises a Client/Bridge Layer 2 Bridge, shown generally by reference numeral 150. The Client/Layer 2 Bridge 150 is coupled to the wireless connection 102 and the wired connection 103 to facilitate transfer of data between the two connections 102, 103. The Client/Bridge Layer 2 Bridge 150 also populates the address fields for the data being transferred in order to correctly transfer the data to the uniquely identified device 110 based on the device MAC number 113. Similarly, the Client/Bridge Layer 2 Bridge 150 populates the fields of the wireless interface as discussed more fully below. Similar to the Client/Bridge Layer 2 Bridge 150, the AP 200 also has an AP Layer 2 Bridge 250 coupled to the AP wireless connection 202 and the AP wired connection 203 to facilitate transferring data between the AP wireless connection 202 and the AP wired connection 203. The AP Layer 2 Bridge 250 also uses the MAC addresses to populate the address fields of the 4A mode wireless interface when communicating across the wireless connection 202 as discussed more fully below. The AP Layer 2 Bridge also facilitates correctly identifying the IED 110 connected behind the Client/Bridge 100 to which the data is being sent by the DEV# MAC number 113.

The AP 200 comprises a list of associated client(s) and devices by MAC number, shown generally by reference 220. This comprises the context cache information shown generally by reference numeral 222 representing the device MAC number 113 of each IED 110 connected to the wired connection 103 of the Client/Bridge 100 communicated with the AP 200. This list 220 also comprises associated data for each Client/Bridge 100 in wireless communication through the wireless media 30 to the AP 200. It is understood that while FIG. 1 illustrates a single Client/Bridge 100, additional Client/Bridges 100 may be in wireless communication through the wireless media 30 with the same AP 200. Similarly, a single Client/Bridge 100 may be in wireless communication 30 with more than one AP 200. FIG. 1 shows a simplified version of the network 10 for illustration purposes.

The Device MAC numbers 113 of each of the plurality of IEDs 110 connected to the Client/Bridge 100 through the wired interface 103 may be determined by device discovery logic 122. This information, referred to as the context cache information 123, may be stored in the device discovery table 120. The Registration/Recovery Daemons 130 transfer a copy of this context cache information 123 from the Discovery Table 120 to the AP 200 using the wireless connection 102. The Registration/Recovery Daemons 130 transfer the context cache information 123 to the AP 200 using the wireless connection 102 periodically and, in particular, when the discovery logic 120 detects a change in the IEDs 110 connected to the wired connection 103. This context cache information 123 is received by the AP 200 and stored in the list of associated client and devices 220 by the corresponding Registration/Recovery Daemons 230 in the AP 200, and shown generally by reference numeral 222. For convenience, reference numeral 123 is used to denote the context cache information stored at a specific Client/Bridge 100 and reference numeral 222 is used to denote the context cache information stored at an AP 200. It is also understood that the context cache information 222 stored at an AP 200 will include the context cache information 123 received from each of the Client/Bridges 100 in wireless communication with the AP 200.

In the case of a failure of the Client/Bridge 100, the Registration/Recovery Daemons 130 and the Registration/Recovery Daemons 230 and AP 200 communicate to recover the most recent context cache information 222 stored in the list 220 at the AP for the corresponding Client/Bridge 100 identified by the Client/Bridge MAC #1 101 from the AP 200 to the Client/Bridge 100. This is represented by the context cache information recovery signal (SCC). The internal components of the AP 200 and the Client/Bridge 100 are shown in more detail in FIGS. 2 and 3, respectively.

Figure 2:
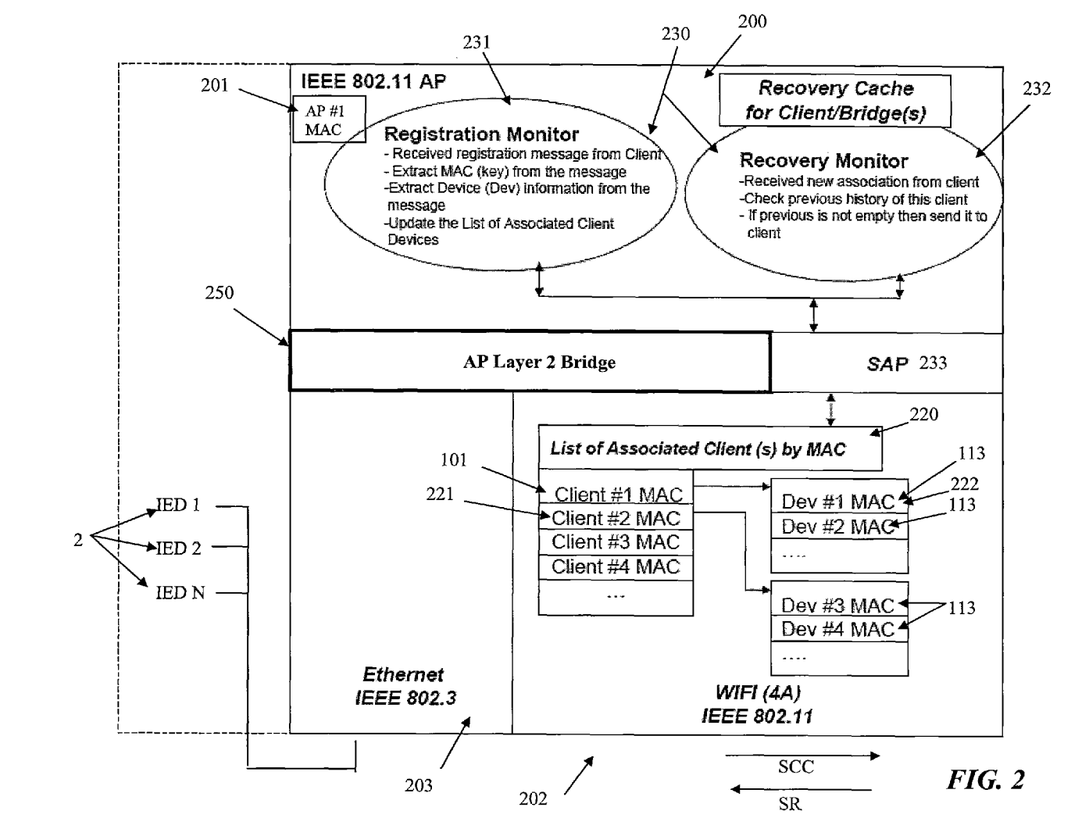
FIG. 2 is an internal view of an Access Point according to one embodiment of the present invention showing the internal structure.
Figure 3:
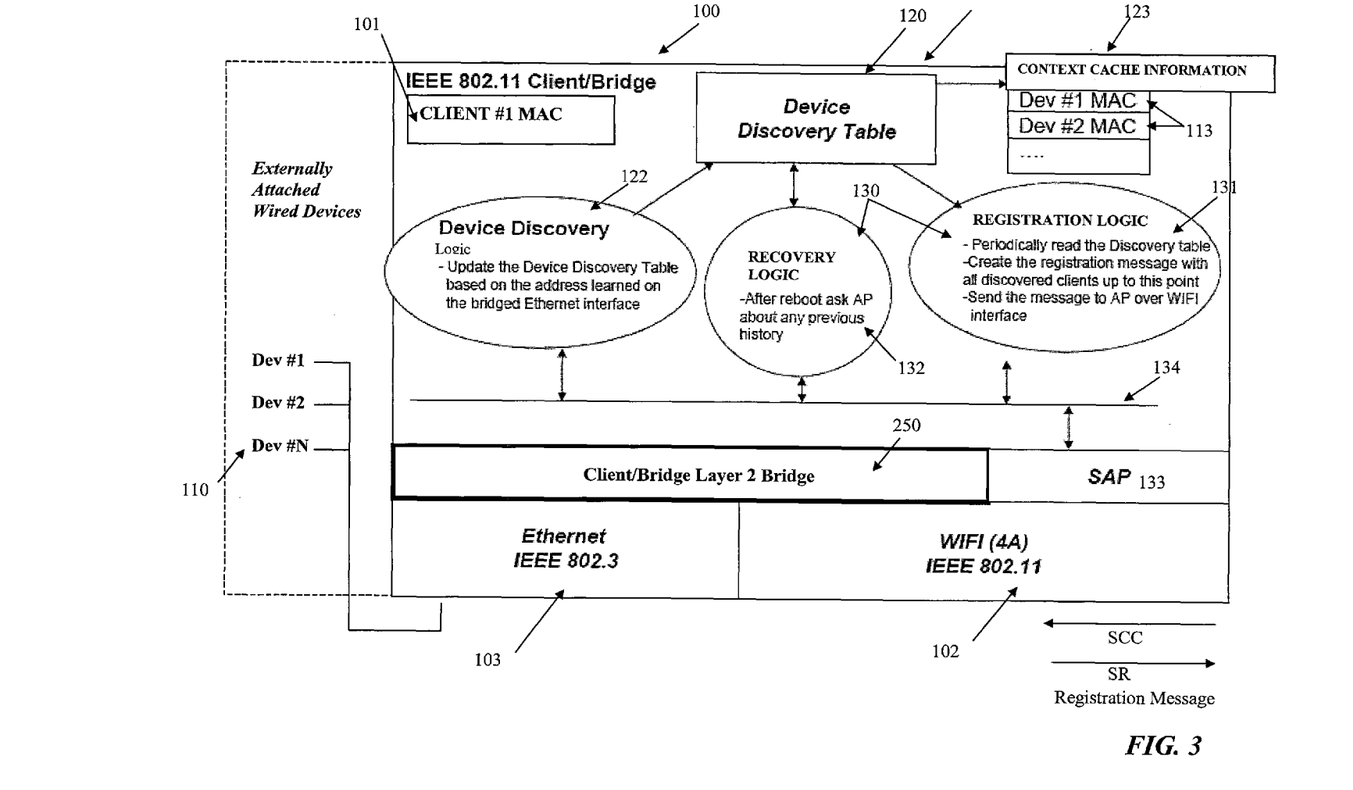
FIG. 3 is an internal view of a Client/Bridge according to one embodiment of the present invention showing the internal structure.

As illustrated in FIG. 2, the list 220 of associated clients and devices comprises a list of Client/Bridge MAC 101 which is in wireless communication with the AP 200 through the wireless connection 202. Also, for each Client/Bridge MAC 101 the associated device MAC numbers 113 which are connected through the wired connection 103 to the associated Client/Bridge 100 is also stored and identified generally by reference numeral 113. It is understood that reference numeral 113 identifies a device MAC number DEV# MAC and corresponds to the device MAC number 113 of the plurality of devices 110 connected to the Client/Bridge 100 as illustrated in FIGS. 1 and 3. Each Client/Bridge 100 will therefore transfer the Client/Bridge MAC 101 together with the device MACs 113 of each of the two or more IEDs 110, also identified by the device numbers (DEV#), to the AP 200. This can be done in a preferred embodiment by the Registration/Recovery Daemons 130, 230 in each of the AP 200 and Client/Bridge 100.

FIG. 2 shows the preferred embodiment where the Registration/Recovery Daemons 230 are separate monitors shown by the Registration Monitor 231 and the Recovery Monitor 230. It is understood that the Registration/Recovery Daemons 230 can be software, or, may be hardwired logic, or a combination of both. In either case, the Registration/Recovery Daemons 230 and the Registration Monitor 231 and Recovery Monitor 232 will have the functionality described herein. In particular, the Registration Monitor 231 will receive the Registration Message Signal (SR) from each Client/Bridge 100 associated with the AP 200. The Registration Monitor 231 will extract the Client/Bridge MAC number 101 of each Client/Bridge 100 transmitting the Registration Message Signal (SR). The Registration Monitor 231 will also extract the Device MAC Numbers 113 for each IED 110 connected to the wired connection 103 of the Client/Bridge 100 representing the client cache information 123 for the Client/Bridge 100 transmitting the Registration Message Signal (SR). This will be used to update the list of associated client(s) 220 as discussed above.

In the case of a failure of the Client/Bridge 100, the recovery monitor 230 will send the context cache Information Recover Signal (SCC) consisting of the Client/Bridge MAC and each of the Device MAC numbers 113 associated with the Client/Bridge MAC most recently stored in the List of Associated Client by MAC 220 representing the context cache information 222 for that Client/Bridge 100. In particular, the Client/Bridge 100, after the end of an interruption of operation, will send a new association signal from the Client/Bridge 100. The recovery monitor 230 will check the previous history for this Client/Bridge 100 based on the Client/Bridge MAC number 101 received with the new association signal. If the list of associate client(s) 220 is not empty for the associated Client/Bridge MAC number 101 the recovery monitor 230 will send the context cache Information Recovery Signal (SCC) to the associated Client/Bridge 100 which sent the new association. This facilitates recovery of Client/Bridge 100.

As also illustrated in FIG. 2, the communication between the registration monitor 231 and the Recovery Monitor 232 may be performed through an SAP 233 or other software to facilitate communication between the monitors 231, 232 and other components in the system 10

FIG. 3 illustrates the internal component of the Client/Bridge 100 in more detail. As illustrated in FIG. 3, the device discovery table 120 stores the context cache information, shown generally by reference numeral 123 for the Client/Bridge 100, and the context cache information 123 may comprise the Device MAC numbers 113 for each of the IEDs 110 connected to the wired connection 103 of the Client/Bridge 100. The Device MAC numbers 113 may be discovered by the device discovery logic 122. This can be done in a number of ways. In one preferred embodiment, the device discovery logic 122 may comprise a discovery mechanism based on ARP (Address Resolution Protocol) or request an ARP response frame, but any other network traffic may also be used. The device discovery logic 122 essentially eavesdrops on the communication between the IEDs 110 connected to the wired connection 103 of the Client/Bridge 100 and stores the associated information regarding the Device MAC 113 for any IEDs 110 found to be communicating through the wired connection 103 of the Client/Bridge 100. In this way, the device discovery logic 122 continuously discovers devices connected to the wired connection 103 of the Client/Bridge 100 and stores their device MAC number 113 in the Client/Bridge Memory 121, preferably in the Device Discovery Table 120 as shown in FIG. 3. This information represents the Device MAC numbers 113 for each of the IEDs 110 connected to the wired connection 103 of the Client/Bridge 100 and may be referred to as the context cache information 123 for this Client/Bridge 100.

The Registration/Recovery Daemons 130 illustrated in FIG. 1 may constitute single software or hardware components or may comprise separate hardware and software components as shown generally by the Registration Logic 131 and Recovery Logic 132 in FIG. 3. The Registration Logic 131 will periodically read the context cache information 123 from the Client/Bridge Memory 121 and the Device Discovery Table 120 and create the Registration Message Signal (SR) to be sent to the AP 200 listing all of the discovered devices 110 which are discovered connected to the wired connection 103 of the Client/Bridge 100 up to this point. The registration logic 131 will send the Registration SR through the wireless connection 102 to be received by the AP 200 and in particular, the registration monitor 231 of the AP 200 as discussed above.

As illustrate in FIG. 3, the Device Discovery Logic 122, Recovery Logic 132 and Registration Logic 131 may communicate through an internal bus 134 and through the SAP 233 to the connection 102, 103.

Under normal operation, the AP 200 may delete the inactive client session for each Client/Bridge 100 after a session timeout occurs. This timeout may be a predetermined period of time set by the AP 200 and, in a preferred embodiment, will be in conformity with the IEEE 802.11 infrastructure. Obviously, deletion of the client session would include deletion of the context cache information 222 for the associated Client/Bridge 100 and this is contrary to the concept of a seamless Layer 2 Bridging between the IEDs 110 connected to the wired connection 103 of the Client/Bridge 100 and other IEDs 2 connected to the overall network 10 through the Access Point (AP) 200. Therefore, in a preferred embodiment, the Client/Bridge 100 will send periodic "keep alive messages" to the AP 200 which will refresh the Client/Bridge session timers as well as the list 220 of associated client(s) and devices in the AP 200. This assists in ensuring that the Client/Bridge 100, as well as the devices 110 connected to the wired connection 103 of the Client/Bridge 100, are not deleted from the list 220 of the AP 200 which could result in data being sent from an IED 2 in the network 10 being lost because it could not be forwarded to the destination IED 110.

Once the Client/Bridge 100 discovers the MAC addresses 113 of the devices 100 connected to the wired connection 103 by the device discovery logic 122, the Client/Bridge 100 must also keep track of these Device MAC addresses 113. One possibility would be to use persistent storage such as non-volatile memory. However, this has been found not to be best for industrial embedded environments because non-volatile memory could be damaged or lost, for instance, during some operation interruptions. Therefore, in a preferred embodiment, the context cache information 123 is also copied to the AP 200 to effect remote storage of the information. Since the Client/Bridge 100 essentially keeps the context cache information 222 synchronized with the AP 200 through the periodic "keep alive messages", the AP 200 can act as a remotely located disaster or interruption recovery storage for the context cache information 222 of the Client/Bridge 100 in communication with the AP 200 and stored at the AP 200. In this way, it is possible to recover the Client/Bridge 100 context cache information 222 from the AP 200 without storing the context cache information 122 in persistent storage at the Client/Bridge. Therefore, the memory 120 of the Client/Bridge 100 storing the context cache information 123 may be volatile memory.

After recovery from an interruption, the recovery logic 132 of the Client/Bridge 100 will ask the AP 200 about previous history of the Client/Bridge 100. The recovery monitor 232 will receive this signal and check the previous history for this Client/Bridge 100 as discussed above. If the previous history for this Client/Bridge 100 identified by the Client/Bride MAC 101 is not empty, the most recent context cache information 222 for the particular Client/Bridge 100 will be sent in a Context Cache Recovery Signal (SCC) from the AP 200 to the Client/Bridge 100 to facilitate recovery of the Client/Bridge 100.

Figure 4:
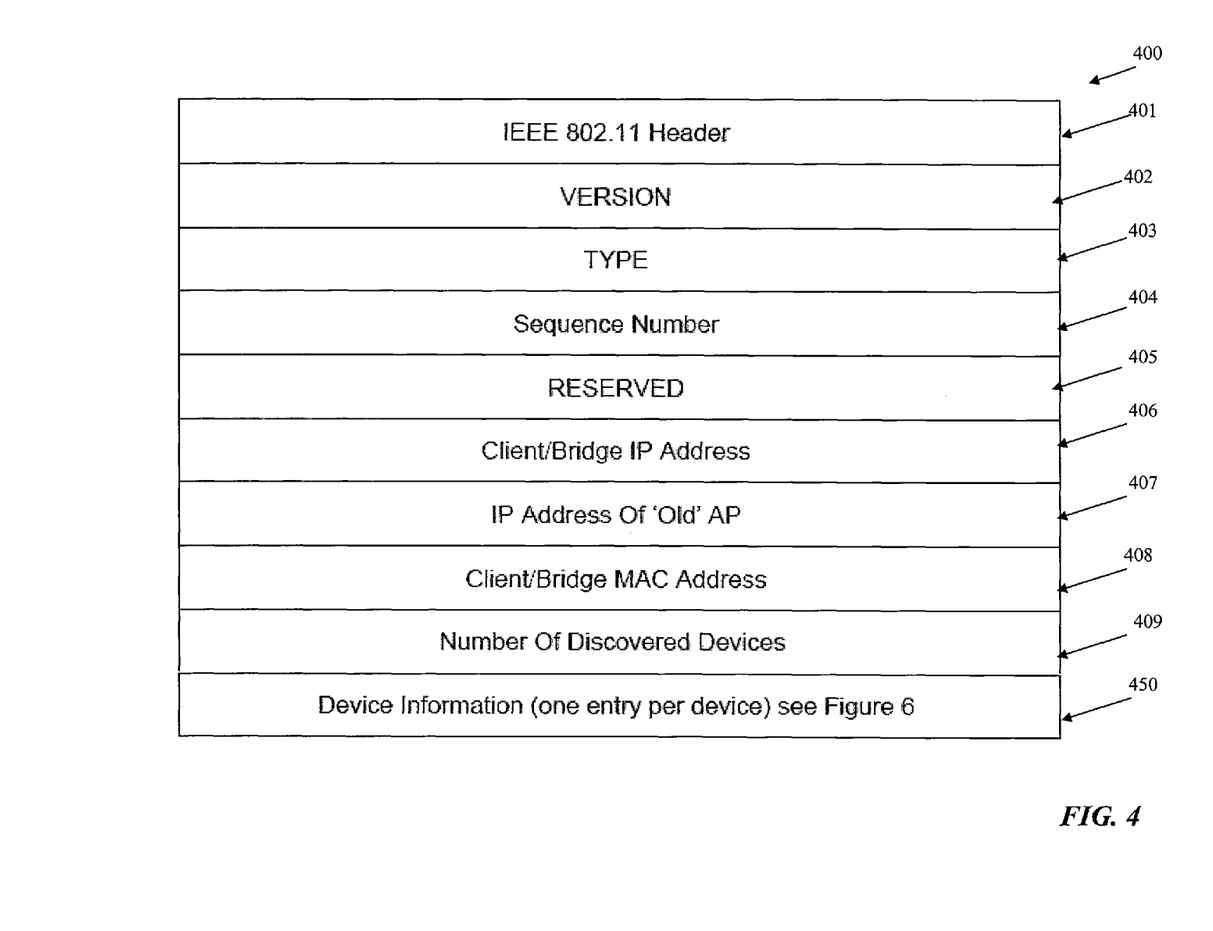
FIG. 4 is a registration/recovery message format used to transfer information according to one aspect of the present invention.

FIG. 4 illustrates a Registration/Recovery message format shown generally by reference numeral 400 used to transfer information according to one aspect of the invention. FIG. 4 illustrates the Registration/Recovery message format 400, for example, which may be used for the Registration Message Signal (SR) and/or the Context Cache Information Recovery Signal (SCC).

As illustrated in FIG. 4 the Message Format, shown generally by reference numeral 400, will comprise an IEEE 802.11 Header 401. This could be a standard IEEE 802.11 Header used to transfer information across a wireless media 30 using the IEEE 802.11 infrastructure.

The message format 400 may also comprise a version field 402 to identify the version being sent. The message format 400 may also comprise a type field 403. The type field 403 may identify the type of message being transmitted. For instance, type=1 may correspond to the registration message request indicating registration information is being requested by the AP 200 or Client/Bridge 100 sending the message, type=2 may identify the registration response, type=3 may identify the recovery message request, type=4 may identify the recovery response signal SR. In the format 400, sequence number field 404 may identify the sequence and field 405 is presently reserved. Field 406 contains the Client/Bridge IP Address and field 407 identifies the IP address of an "Old" AP which can be used when the Client/Bridge 100 undergoes network roaming and moves from a first AP#1 200 to a second AP#2 200 as discussed more fully below. Field 408 may comprise the Client/Bridge MAC address corresponding to the Client/MAC number 101 referencing the Client/Bridge 100 that the message 400 is regarding. This information would also appear in one of the fields in the IEEE 802.11 Header 401, but is repeated here also.

The number of discovered devices field 409 comprises the number of devices 110 that have been discovered by the discovery logic 122 behind the Client/Bridge 100 and connected to the wired connection 103. For instance, in the embodiment shown in FIG. 1, there are three devices 110 shown as Dev#1, Dev#2 and Dev#3 connected to the wired connection 103 of the Client/Bridge 100 and therefore this field 409 would contain the value 3 for the Client/Bridge 100. It is understood that the value in field 409 may change depending on the number of devices 110 which the device discovery logic 122 has discovered behind the corresponding Client/Bridge 100. In FIG. 3, for example the devices are Dev#1, Dev#2 and Dev#N illustrating that there could be a plurality or "N" devices 110 connected to the wired connection 103.

The device information field 450 will then have the information for each of the devices 110 discovered behind the Client/Bridge 100 identified by the Client/Bridge MAC Address identified in field 408. The number of entries here will correspond to the value in the number of discovered devices field 409. The information contained in the Device Information field is outlined in FIG. 5.

Figure 5:
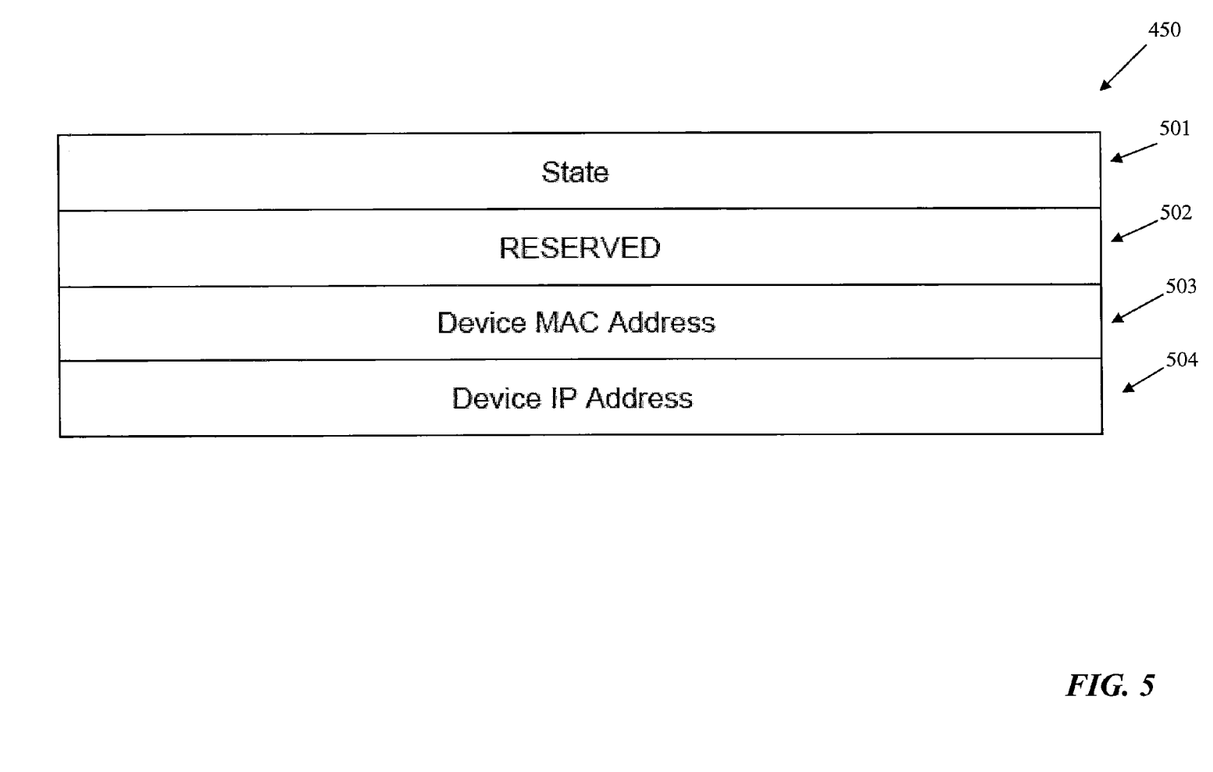
FIG. 5 is the device information field format of the registration/recovery message format according to one aspect of the present invention.

As shown in FIG. 5, the device information field 450 may have a state field 501, a reserved field 502, a device MAC address field 503 and a device IP address 504. The state field 501 will show the state of the device 110 which is identified by the device MAC address 113 appearing in the device MAC address field 503. The device IP address field 504 will also have the IP address for the corresponding device MAC address 503 to facilitate transfer of data. Similar information will then be repeated for each of the devices 110 connected to the Client/Bridge 100 through the wired connection 103 as identified by the values in the number of discovered devices field 409.

Figure 6:
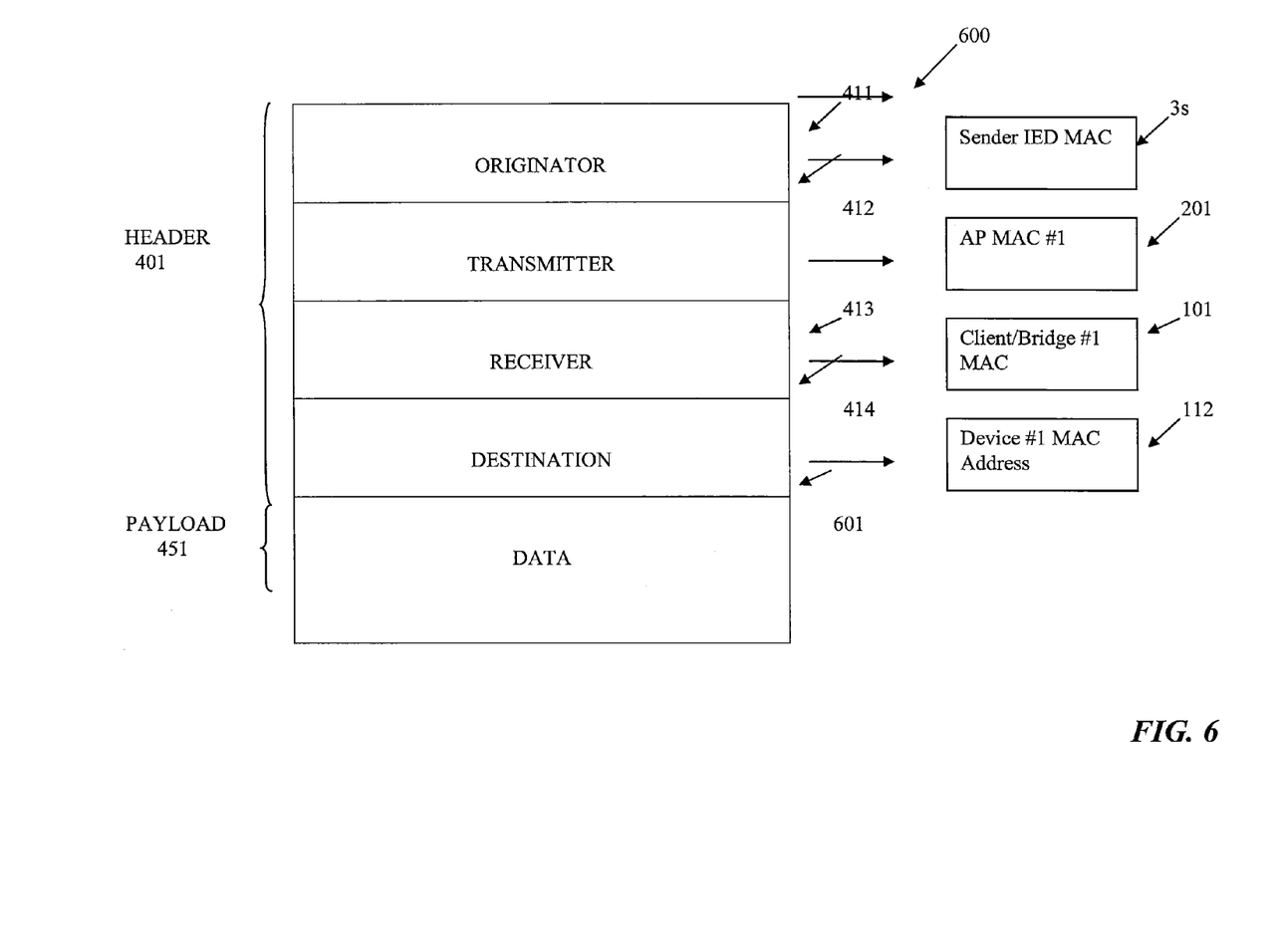
FIG. 6 is a message format used to transmit data from a sender IED in the network to an IED connected to a Client/Bridge.

FIG. 6 illustrates a message format shown generally by reference numeral 600, for sending data from a sender IED 2s in the network 10 to one of the plurality of IEDs 110 connected to the wired connection 103 of one of the Client/Bridges 100. The message format 600 preferably comprises a header 401 which may be a standard IEEE 802.11 header 401 similar to that shown in FIG. 4 together with the data 601 to be sent as the payload 451 of the message.

As illustrated in FIG. 6, the message format 600 will have the 4 address mode wireless interface fields, namely the originator field 411, the transmitter field 412, the receiver field 413 and the destination field 414. When data is being sent from the sender IED 2s to a device Dev#1 connected to a Client/Bridge 100 the address fields will populated as shown in FIG. 6. In particular, the originator field 411 will have the sender IED MAC 3s identifying the sender IED 2s. The transmitter field 412 will have the AP MAC #1 201. The receiver field 413 will have the Client/Bridge #1 MAC 101 and the destination field 414 will have the device DEV#1 MAC address 113 uniquely identifying the IED 110 connected to the wired connection 103 of the Client/Bridge 100. In this was, data may be sent across the network 10, and specifically across the wireless medium 30, from the AP 200 to the Client/Bridge 100. The Client/Bridge Layer 2 Bridge 150 will transfer the data 601 from the wireless connection 102 to the wired connection 103 and reformat the header information 401 to comply with the wired connection 103 and transfer the data 601 to the device 110 connected to the wired connection 103 and having a DEV#1 MAC number 113 corresponding to the Dev#1 MAC address contained in the destination field 414 of the header 401. It is also understood that the data message would only be received by the Client/Bridge 100 if the receiver field 413 has a value corresponding to the Client/Bridge #1 MAC 101 of the Client/Bridge 100. Otherwise, the Client/Bridge 100 identified by the Client/Bridge #1 MAC 101 would not receive the data message.

Figure 7:
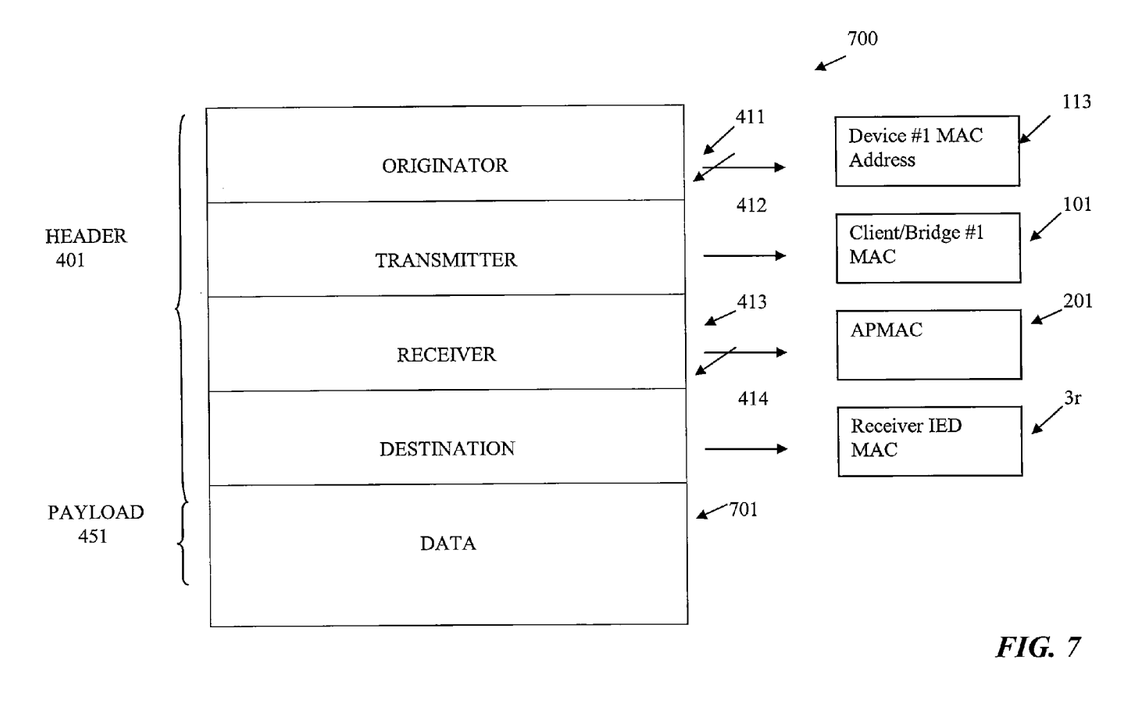
FIG. 7 is a message format used to transfer data from an IED connected to a Client/Bridge to a receiver IED in the network.

FIG. 7 shows the message format for sending data from a device 110 connected to a wired connection 103 of the Client/Bridge 100 to a receiver IED 3r in the network 10, which data messages are generally identified by reference numeral 700. Similar to data message 600, data message 700 has a header 401 and a payload 451. The header 401 will have an originator field 411, a transmitter field 412, a receiver field 413 and a destination field 414 and will probably comply with the IEEE 802.11 infrastructure. The payload 451 will comprise data, shown generally by reference numeral 701, to be sent from the device 110 to the receiver IED 2s in the network 10.

As illustrated in FIG. 7, the originator field 411 will have the DEV #1 MAC 113 identifying the MAC of the device 110 transmitting the data 701. The transmitter field 412 will comprise the Client/Bridge #1 MAC 101 identifying the Client/Bridge 100 to which the IED 110 sending the data 701 is connected through the wired connection 103. The receiver field 413 will comprise the AP MAC 201 uniquely identifying the AP 200 to which the Client/Bridge 100 communicates through the wireless media 30. The destination field 414 will comprise the receiver IED MAC 3r uniquely identifying the receiver IED 2r to which the data 701 is destined.

In operation, the IED 110 sending the data 701, in this example being DEV#1 and uniquely identified by DEV#1 MAC 113, will send the data 701 and identify the receiver IED MAC 3r to the Client/Bridge 100 using the wired connection 103. In a preferred embodiment, this wired connection 103 will comply with the IEEE 802.3 infrastructure. The Client/Bridge Layer 2 Bridge 150 will receive the data 701 and the receiver IED MAC 3r and convert the data for transfer across the wireless media 30. In so doing, the Client/Bridge Layer 2 Bridge 150 creates the header 401 shown in FIG. 7 by populating the originator, transmitter, receiver and destination address fields 411, 412, 413, 414 with the device MAC 113 uniquely identifying one of the IEDs 110 connected to the Client/Bridge 100 through the wired connection 103, the Client/Bridge MAC #1 201, the AP MAC 102 and the receiver MAC 3r uniquely identifying the IED 2s in the network 10 to receive the data 701.

Figure 8A:
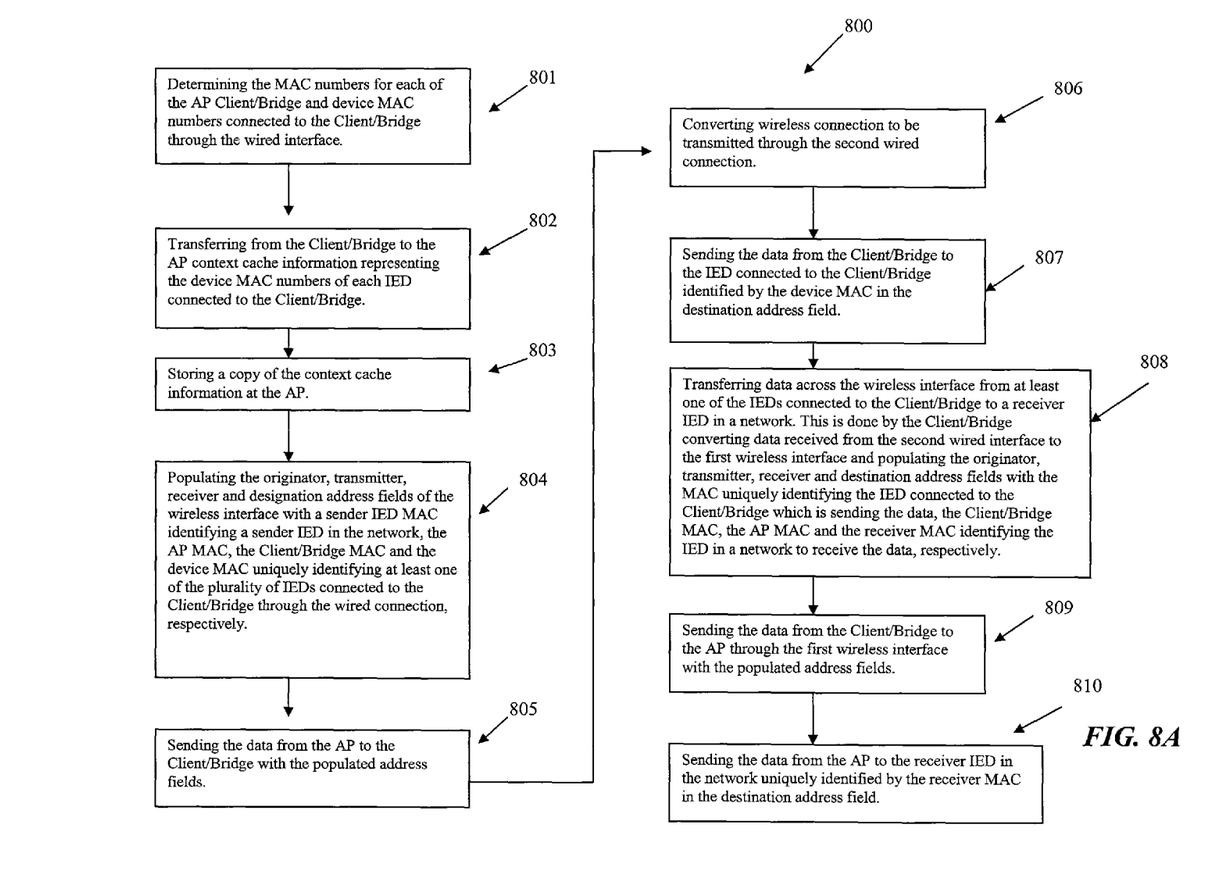
FIG. 8A is a flow chart showing a method of transferring data according to one embodiment of the present invention.

FIG. 8A illustrates a flow chart, as shown generally by reference numeral 800, comprising some of the steps for transferring data between the IEDs 110 connected through the wired connection 103 to the Client/Bridge 100 and other IEDs 2 connected to the network 10. As illustrated in FIG. 8A, in step 801, the MAC numbers 101, 201 and 113 are determined for each of the AP 200, the Client/Bridge 100 and also the IEDs 110 connected to the Client/Bridge 100 through the wired connection 103. This can be performed by a number of means including using of the Discovery Logic 122 discussed above Once the device MAC numbers 113 for each of the IEDs 110 connected to the Client/Bridge 100 through the wired connection 103 have been determined, this information is transferred from the Client/Bridge 100 to the AP 200 as shown at step 802. This information, representing the context cache information 222, will then be stored at the AP 200 as shown at step 803 and used to facilitate transfer of data across the wireless medium 30 from the AP 200 to the Client/Bridge 100 and then on to the IEDs 110.

When data is to be transferred from a sending IED 2s to one of the plurality of IEDs 110 connected to the Client/Bridge 100 through the second wired connection 103, the header 401 for the wireless interface will be populated such that the originator 411, transmitter 412, receiver 413 and destination address fields 414 contain the sender IED MAC 3s identifying a sender IED 2s in the network 10, the AP MAC 201, the Client/Bridge MAC 101 and a device MAC 113 uniquely identifying the at least one of the plurality of IEDs 110 connected to the Client/Bridge 100 to the second wired interface 103, respectively, as shown at step 804. The data can then be sent from the AP 200 to the Client/Bridge 100 with these populated address fields 411,412.413.414 as shown at step 805. Once the data is sent, the Client/Bridge 100, and in a preferred embodiment the Client/Bridge layer 2 bridge 150, converts the data received through the wireless connection 102 to be transmitted through the wired connection 103 as shown at step 806. This conversion will be made as outlined above by converting the data and, in particular, the information in the IED header 401 into the format consistent with the wired connection 103. The data will then be sent from the Client/Bridge 100 to the one of the plurality of IEDs 110 connected to the Client/Bridge 100 identified by the device MAC 113 and the destination address field 414 as discussed above and as illustrated at step 807 in FIG. 8A. To transfer data in the reverse direction from one of the plurality of IEDs 110 connected to the Client/Bridge 100, data is first sent from the IED 110 connected to the wired connection 103 of the Client/Bridge 100 through the wired connection 103. The Client/Bridge 100 then converts the data, including the address information, received through the wired connection 103 to a format consistent with the wireless connection 102. In particular, as illustrated in step 808, and also discussed above, the Client/Bridge 100 will populate the originator 411, transmitter 412, receiver 413 and destination address fields 414 with the device MAC 113 uniquely identifying the IED 110 connected to the Client/Bridge 100 which is sending the data 701, the Client/Bridge MAC 101, the AP MAC 201 and the receiver MAC 3r identifying the IED 2r in the network 10 to receive the data 701, respectively. The data is then sent from the Client/Bridge 100 to the AP 200 through the first wireless interface with these populated address fields as illustrated in step 809. The AP 200 then receives the data and converts the data from the wireless interface for transmission through the wired connection 203 using the AP Layer 2 bridge 250 as discussed above and sends the data to the receiver IED 2r in the network 10 uniquely identified by the receiver MAC 3r in the destination fields 414.

Figure 8B:
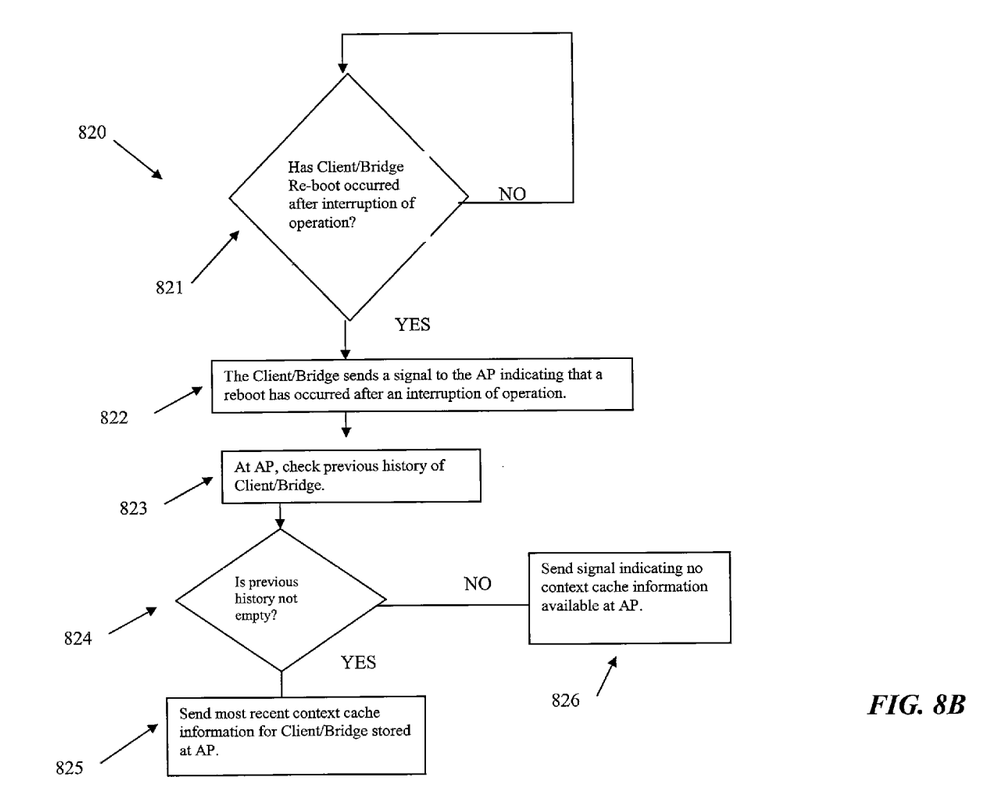
FIG. 8B is a flow chart illustrating a method of recovering data at a Client/Bridge after an interruption of operation.

FIG. 8B illustrates a flow chart, as shown generally by reference numeral 820, showing the steps that occur at reboot of the Client/Bridge 100 after an interruption of operation has occurred. As illustrated in flow chart 820, a continuous decision is made at step 820 to determine if the Client/Bridge 100 has rebooted after an interruption of operation. It is understood that this step 820 can be made as a normal reboot procedure, or, can be performed continuously or periodically. If the result of this decision 821 is no, then it can loop across and be performed again, or, decision 821 could be a single decision that occurs once upon rebooting of the Client/Bridge 100. If the result of the decision 821 is YES, the flow chart 820 proceeds to step 822 where the Client/Bridge 100 sends a signal to the AP 200 indicating that a reboot has occurred after an interruption of operation.

As step 823 the AP 200, and in a preferred embodiment the recovery monitor 232, will check the previous history for the Client/Bridge 100 identified by the Client/Bridge MAC 101, in the signal sent in step 822. At step 824, the AP 200 will make a decision as to whether or not the previous history for the Client/Bridge 100 identified by the Client/Bridge MAC 101 in the signal in step 822 has a history stored at the AP 200. The history will comprise the context cache information 222 as discussed above and may be identified in the list 220 by the Client/Bridge #1 MAC 101 stored in the list 220 of associated clients in a preferred embodiment. If the result decision 824 is YES, the AP 200 will proceed to step 825 and send the most recent context cache information 222 to the Client/Bridge 100 as stored at the AP 200 and uniquely identified by the Client/Bridge MAC 101 identified in the signal sent in step 822. If the results of decision 824 is NO, the AP 200 will send a signal to the Client/Bridge 100 indicating that no context cache information is available at the AP 200. The Client/Bridge 100 will then continue to discover the device MAC numbers 113 for each of the plurality of IEDs 110 attached to the wired connection 103 using the device discovery logic 122 as outlined above.

It is also understood that the device discovery logic 122 will continue to perform its function of eavesdropping for communications of the IEDs 110 connected to the wired connection 103 of the Client/Bridge 100, as discussed above, even if the context cache information 222 stored at the AP 200 is sent to the Client/Bridge 100 at step 825. This is required, to see if there has been any changes to the IEDs 110 connected to the wired connection 103 of the Client/Bridge 100. This would also be required to see if there has been any interruption of operation of any of the IEDs 110 connected to the wired connection 103 which have not been recovered together with the Client/Bridge 100. For example, it is possible that an IED 110 connected to the wired connection 103 of a Client/Bridge 100 may fail causing a temporary failure of the Client/Bridge 100. The Client/Bridge 100 may then recover after this temporary interruption of operation, but the IED 110 that caused the interruption may still remain offline. In this case, the context cache information 222 being sent from the AP 200 to the Client/Bridge 100 will assist the Client/Bridge 100 in rebooting and populating the context cache information 222 stored at the device discovery table 120 of the Client/Bridge 100. This will save considerable time and improve the robustness of the Client/Bridge 100 by more quickly permitting communication with the IEDs 110 which have not suffered a fatal interruption of service. However, the context cache information 222 sent from the AP 200 may be outdated by including an IED 110 which is no longer operating, or, not including an IED 110 which has been recently.

Figure 9:
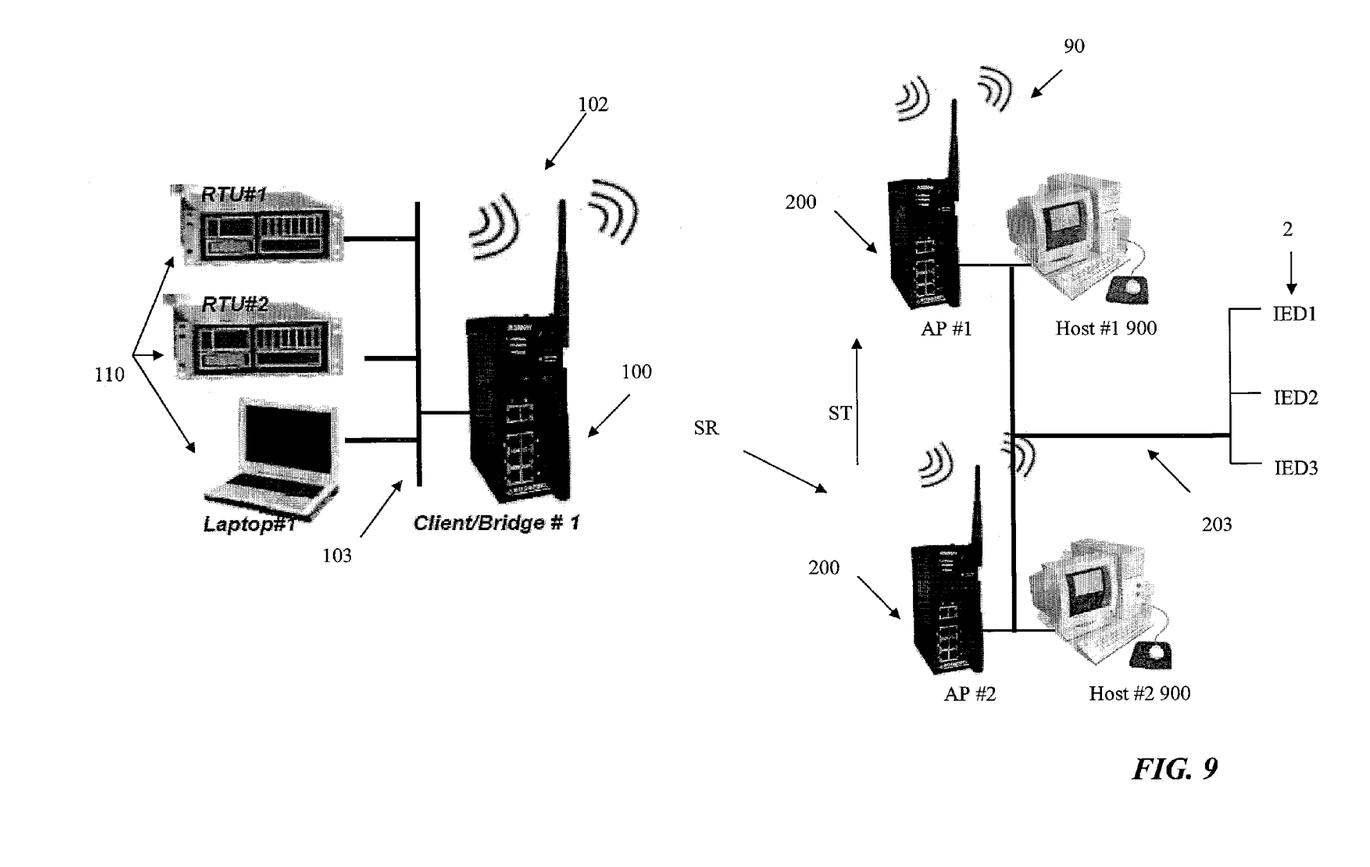
FIG. 9 is a symbolic representation of a Client/Bridge roaming between two access points and a Tabular overview of protocol functions of individual devices shown therein according to one embodiment of the present invention.

FIG. 9 illustrates a symbolic representation of a Client/Bridge 100 roaming between two access points AP #1 and AP #2, both identified by reference numeral 200. The Client/Bridge #1 is connected to the wired connection 103 to IEDs 110. In FIG. 9, the IEDs are identified by remote terminal units (RTU#1 and RTU#2) and Laptop #1 identifying a PC. The RTU#1, RTU#2 and Laptop #1 are connected to the wired connection 103 to the Client/Bridge #1 100. Client/Bridge #1 communicates through the wireless interface 102 through the wireless medium 30 to the AP #1 200. AP #1 200 is connected to host 900 and through a wired connection 203 to a plurality of IEDs 2. The Client/Bridge 100 may comprise discovery logic 122 similar to that described above, for determining the unique device media access control (MAC) numbers at each IED 110 connected to the wire connection 103 and will store this information representing the context cache information 123 at the memory 121 of the Client/Bridge 100. The context cache information 123 may then be transferred through the layer 2 bridge 150 to the AP 200 as described above.

As is apparent from FIG. 9, the Client/Bridge #1 can move relative to the AP #1 200. The network shown in FIG. 9 generally by reference numeral 90, also comprises a second AP #2 200 connected to another host #2 900. When the first Client/Bridge #1 100 moves from near the first AP #1 to near the second AP #2, the Client/Bridge 100 transfers the context cache information 123 to the second AP #2 200 for storage locally in the second AP #2 memory 220. This can be done, for example, the Client/Bridge 101 sending a Registration Message Signal SR to the second AP#2 200. The second AP#2 in turn sends a transfer signal ST to the first or old AP #1 comprising the MAC of the second AP. This is illustrated, for example, in FIG. 4 by the address field 406 identifying the IP address of 'Old' AP. When such a transfer signal ST is sent, the AP #1, identified as the 'Old' AP in field 406, will delete the Client/Bridge #1 MAC 101 from its list of associate clients 220 as well as the device MACs 113 from the list 220 and this information will then appear in the corresponding list 220 of AP #2 200. After this transfer signal ST is sent and received, data transferred in the network 90 to one of the IEDs 110 connected to the first Client/Bridge #1 100 will be sent through the second AP #2 200. This will occur, for instance, because the AP #2 MAC #2 201 will appear in the transmitter field 412 of the header 401 shown in FIG. 6 instead of the AP MAC #1 as shown in current FIG. 6. Similarly, when data is sent from the IED 110 connected to the wired connection 103 of the Client/Bridge #1 100, the AP MAC #2 201 for AP #2 200 will appear in the receiver field 413. In this way, the Client/Bridge 100, as well as the IEDs 110 connected through the wired connection 103 to the Client/Bridge 100, can network roam within the network 90 from a first AP #1 200 to a second AP #2 200.

It is understood that in the context of this invention, Layer 2 may refer to the Data Link Layer of the commonly referenced multi-layer communication model, Open System Inter Connection. For example, in a network, data may be directed at the Layer 2 level using the destination MAC address to determine where to direct the data. The Data Link Layer described in the IEEE 802 LAN Standards may contain 2 sub layers, namely the Media Access Control (MAC) sub layer and the Logical Link Control (LCC) sub layer. The Data Link Layer may be used to ensure an initial data connection has been set-up, divide out data into data frames, and to handle acknowledgements from a receiver that data arrived successfully. It may also ensure that incoming data has been received successfully by analyzing bit patters in the frames.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification maybe used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The invention claimed is:

1. In a network having a plurality of Intelligent Electrical Devices (IEDs), a method of transferring data from an Access Point (AP) through a first 4 Address (4A) mode wireless interface having originator, transmitter, receiver and destination address fields, to at least one of a plurality of Intelligent Electrical Devices (IEDs) connected to a Client/Bridge through a second wired interface, said method comprising:
   determining a unique Media Access Control (MAC) number for each of the AP and the Client/Bridge;
   determining, by the Client/Bridge, the device MAC numbers for each of the plurality of IEDs connected to the Client/Bridge through the second wired interface and storing, at the Client/Bridge, context cache information representing the device MAC numbers of each IED connected to the Client/Bridge, wherein the step of determining comprises monitoring by the Client/Bridge inter-IED communication generated by the plurality of IEDs connected to the Client/Bridge through the second wired interface;
   transferring from the Client/Bridge to the AP the context cache information when the Client/Bridge detects a change in the plurality of IEDs through said monitoring, said transferring using the first 4 Address (4A) mode wireless interface;
   storing a copy of the context cache information at the AP;
   populating the originator, transmitter, receiver and destination address fields of the first 4 Address (4A) mode wireless interface with a sender IED MAC identifying a sender IED in the network, the AP MAC, the Client/Bridge MAC and the device MAC uniquely identifying the at least one of the plurality of IEDs connected to the Client/Bridge through the second wired interface, respectively;
   sending the data from the AP to the Client/Bridge;
   converting, at the Client/Bridge, the data from the first 4 Address (4A) mode wireless interface to the second wired interface; and
   sending the data from the Client/Bridge to the at least one of the plurality of IEDs connected to the Client/Bridge identified by the device MAC in the destination address field;
   wherein, if the Client/Bridge experiences an interruption of operation, the AP transfers the most recent context cache information stored at the AP to the Client/Bridge to facilitate rapid recovery of the Client/Bridge.

2. The method as defined in claim 1 further comprising:
   transferring data across the first 4 Address (4A) mode wireless interface from the at least one of the plurality of IEDs connected to Client/Bridge to a receiver IED in the network by:
   sending the data from the at least one of the plurality of IEDs connected to the Client/Bridge through the second wired interface to the Client/Bridge, said data comprising a receiver MAC uniquely identifying the receiver IED in the network to receive the data;
   converting, at the Client/Bridge, the data from the second wired interface to the first 4 Address (4A) mode wireless interface;
   populating the originator, transmitter, receiver and destination address fields with the device MAC uniquely identifying the at least one of the plurality of IEDs sending the data, the Client/Bridge MAC, the AP MAC, and the receiver MAC uniquely identifying an IED in the network to receive the data, respectively;
   sending the data from the Client/Bridge to the AP through the first 4 Address (4A) mode wireless interface with the populated address fields; and
   sending the data from the AP to the receiver IED in the network uniquely identified by the receiver MAC in the destination address field.

3. The method as defined in claim 1 further comprising transferring from the Client/Bridge to the AP the context cache information periodically at predetermined time periods, said predetermined time periods being less than the session time out time period of the AP for the Client/Bridge.

4. The method as defined in claim 1 wherein the first 4 Address (4A) mode wireless interface is IEEE 802.11 infrastructure compatible.

5. The method as defined in claim 1 wherein the second wired interface is IEEE 802.3 infrastructure compatible.

6. The method as defined in claim 5 wherein the first 4 Address (4A) mode wireless interface is IEEE 802.11 infrastructure compatible.

7. A Client/Bridge to transfer data between a wireless access point (AP) utilizing a first 4 Address (4A) mode wireless interface having originator, transmitter, receiver and destination address fields, and, two or more Intelligent Electrical Devices (IEDs) connected to the Client/Bridge and utilizing a second wired interface, said Client/Bridge comprising:
   a wireless connection to communicate with the AP through the first 4 Address (4A) mode wireless interface;
   a wired connection to communicate with the two or more IEDs connected to the Client/Bridge through the second wired interface;
   discovery logic for determining unique device Media Access Control (MAC) numbers of each IED connected to the second wired connection, wherein the discovery logic determines the unique device MAC numbers by monitoring inter-IED communication generated by the two or more IEDs connected to the Client/Bridge through the second wired interface;
   memory for storing context cache information representing the device MAC numbers of each IED connected to the wired connection;
   registration logic for transferring the context cache information to the AP using the wireless connection, wherein the registration logic transfers the context cache information to the AP using the wireless connection when the discovery logic detects a change in the IEDs connected to the second wired connection through said monitoring;

a Layer 2 bridge coupled to the wireless connection and the wired connection, said Layer 2 bridge transferring data between the wireless connection in the first 4 Address (4A) mode wireless interface and the wired connection in the second wired interface;

recovery logic for recovering the context cache information from the AP through the wireless connection;

wherein data is received by the wireless connection if the receiver address field of the first 4 Address (4A) mode wireless interface uniquely identifies a MAC of the Client/Bridge;

wherein the data is converted by the layer 2 bridge to the second wired interface and sent to the IED connected to the wired connection having a device MAC identified in the context cache stored in memory that corresponds to the device MAC number in the destination address field of the 4 Address (4A) mode wireless interface associated with the data; and wherein, if the Client/Bridge experiences an interruption of operation, the recovery logic recovers the most recent context cache information sent to the AP by the Client/Bridge to facilitate rapid recovery of the Client/Bridge.

8. The Client/Bridge as defined in claim 7 wherein the registration logic transfers to the AP the context cache information using the first 4 Address (4A) mode wireless interface periodically at predetermined time periods, said predetermined time periods being less than the session time out time period of the AP for the Client/Bridge.

9. The Client/Bridge as defined in claim 7 wherein the Client/Bridge transfers data across the first 4 Address (4A) mode wireless interface from one of the two or more IEDs connected to the Client/Bridge through the second wired connection by populating the originator, transmitter, receiver and destination address fields of the first 4 Address (4A) mode wireless interface with the device MAC uniquely identifying one of the two or more IEDs, the Client/Bridge MAC, the AP MAC and a receiver MAC uniquely identifying an IED in the network to receive the data, respectively.

10. The Client/Bridge as defined in claim 9 wherein data to be transferred from the at least one of the two or more IEDs connected to the wired connection transfer data to a receiver IED by sending the data from the one of the two or more IEDs connected to the wired connection to the Client/Bridge where data is received by the wired connection and converted by the layer 2 bridge to the first 4 Address (4A) mode wireless interface and sent to the AP identified by the AP MAC in the receiver address field of the first 4 Address (4A) mode wireless interface and then sent by the AP to the receiver IED identified by the receiver MAC contained in the destination address field.

11. The Client/Bridge as defined in claim 7 wherein the first 4 Address (4A) mode wireless interface is IEEE 802.11 infrastructure compatible.

12. The Client/Bridge as defined in claim 7 wherein the second wired interface is IEEE 802.3 infrastructure compatible.

13. A network for transferring data, said network comprising:

a first Access Point (AP) for transferring data through a first 4 Address (4A) mode wireless interface having originator, transmitter, receiver and destination address fields;

a first Client/Bridge for transferring data from the Access Point through the first 4 Address (4A) mode wireless interface to two or more Intelligent Electrical Devices (IEDs) connected to the first Client/Bridge through a second wired interface;

wherein each of said first AP, said first Client/Bridge and said two or more IEDs have a unique Media Access Control (MAC) number to uniquely identify them in the network, and, said Client/Bridge determines the MACs of said two or more IEDs connected thereto through the second wired interface and stores context cache information representing the device MAC numbers of each IED connected to the Client/Bridge through the second wired interface locally in Client/Bridge memory;

wherein the Client/Bridge determines the MACs of said two or more IEDs connected through the second wired interface by monitoring inter-IED communication generated by said two or more IEDs connected through the second wired interface;

wherein the Client/Bridge periodically transfers the content cache information to the first AP for storage locally in said first AP memory, and wherein the Client/Bridge transfers the content cache information to the first AP for storage locally in said first AP memory when the Client/Bridge detects a change in the two or more IEDs through said monitoring;

wherein data transferred from the first AP to the first Client/Bridge contains the first AP MAC in the transmitter field, the first client/Bridge MAC in the receiver field and the MAC of the IED to which the data is destined in the destination field;

wherein the Client/Bridge converts the received data through the first 4 Address (4A) mode wireless interface to the second wired interface and sends the data to the IED having the MAC contained in the destination field through the second wired interface; and wherein, if the Client/Bridge experiences an interruption of operation, the AP transfers the most recent context cache information stored at the AP to the Client/Bridge to facilitate recovery of the Client/Bridge.

14. The network as defined in claim 13 further comprising:

a second Access Point (AP) for transferring data through the first 4 Address (4A) mode wireless interface having originator, transmitter, receiver and destination address fields, said second AP located remotely from the first AP;

wherein when the first Client/Bridge moves from near the first AP to near the second AP, the first Client/Bridge transfers the context cache information to the second AP for storage locally in second AP memory and the second AP sends a transfer signal to the first AP comprising the MAC of the second AP; and wherein, after sending of the transfer signal, data transferred in the network to one of the IEDS connected to the first client/bridge from the second AP contains the second AP MAC in the transmitter field, the first client/Bridge MAC in the receiver field and the MAC of the IED to which the data is destined in the destination field; and wherein the Client/Bridge converts the received data from the second AP through the first 4 Address (4A) mode wireless interface to the second wired interface and sends the data to the IED having the MAC contained in the destination field through the second wired interface.

* * * * *